H. F. LIEDTKE.
INTERNAL COMBUSTION AND STEAM ENGINE.
APPLICATION FILED NOV. 18, 1912.

1,217,788.

Patented Feb. 27, 1917.
5 SHEETS—SHEET 1.

Witnesses:
Jas. E. Hutchinson
Gertrude Wedemeier

Inventor
Hugo F. Liedtke
By Burnham, Attorney

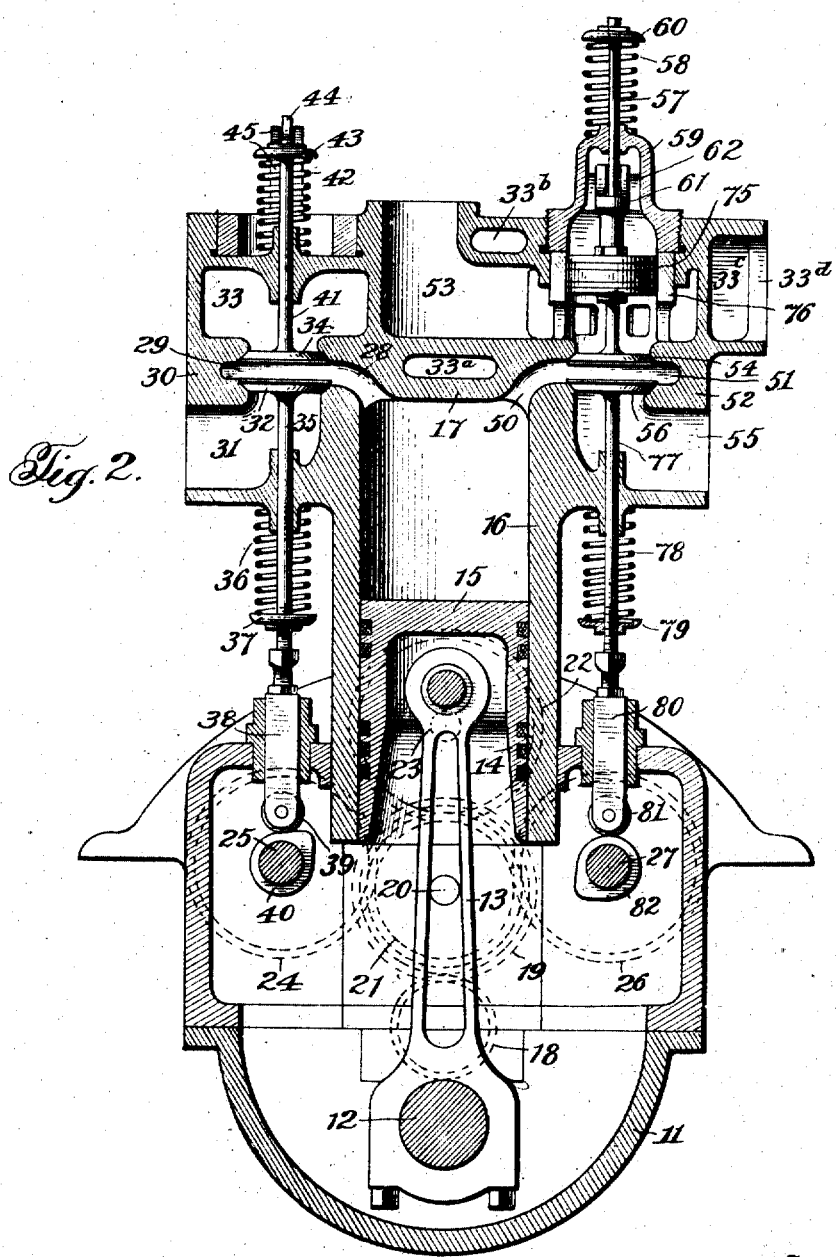

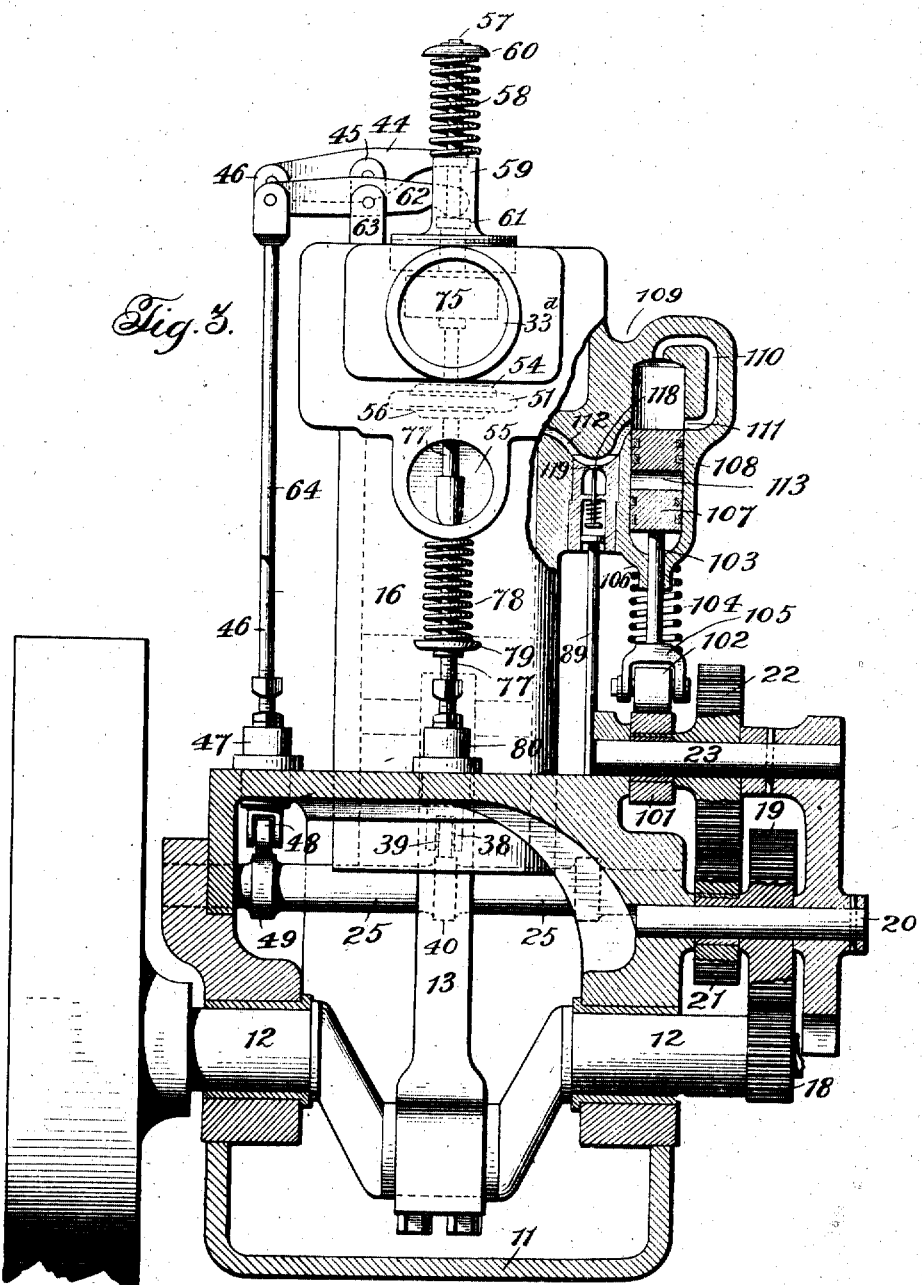

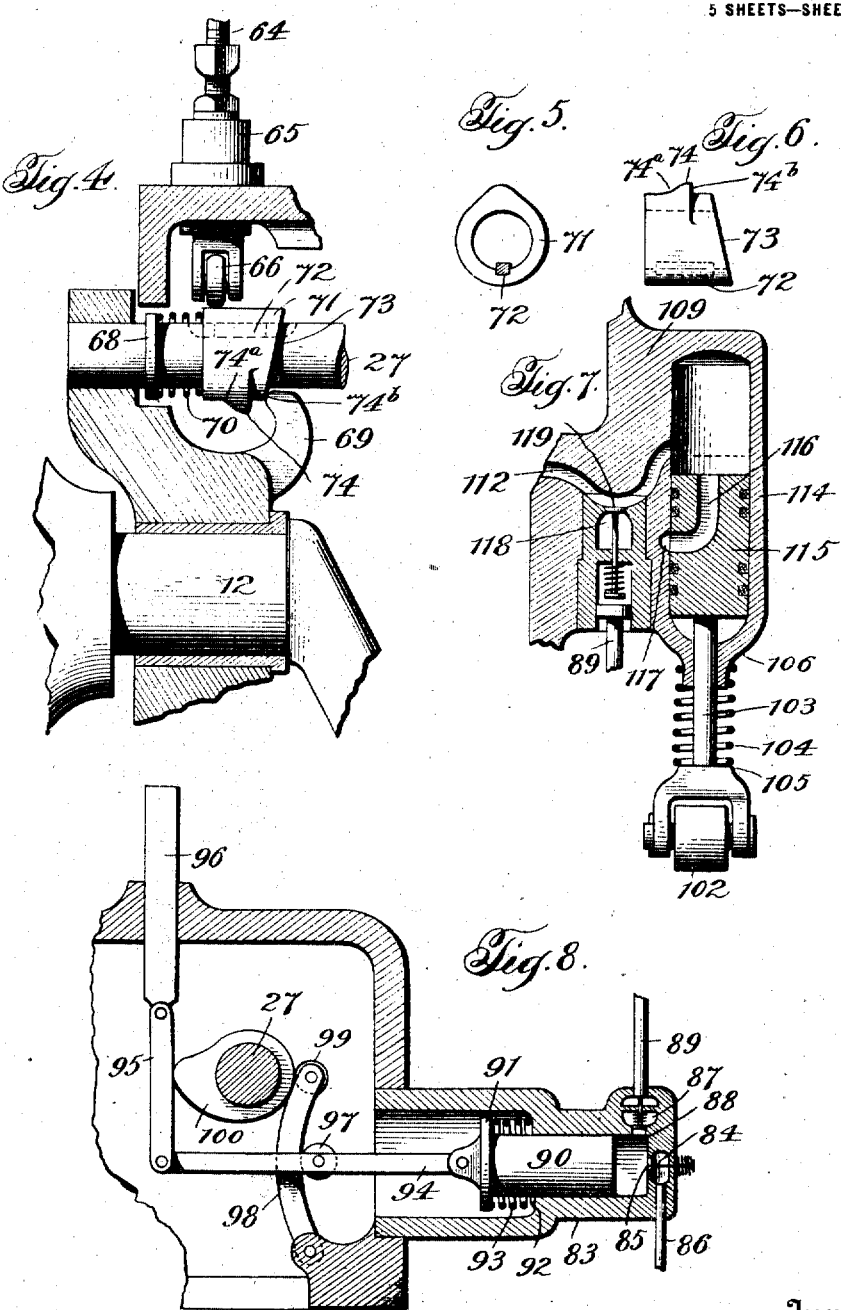

H. F. LIEDTKE.
INTERNAL COMBUSTION AND STEAM ENGINE.
APPLICATION FILED NOV. 18, 1912.
1,217,788.
Patented Feb. 27, 1917.
5 SHEETS—SHEET 5.
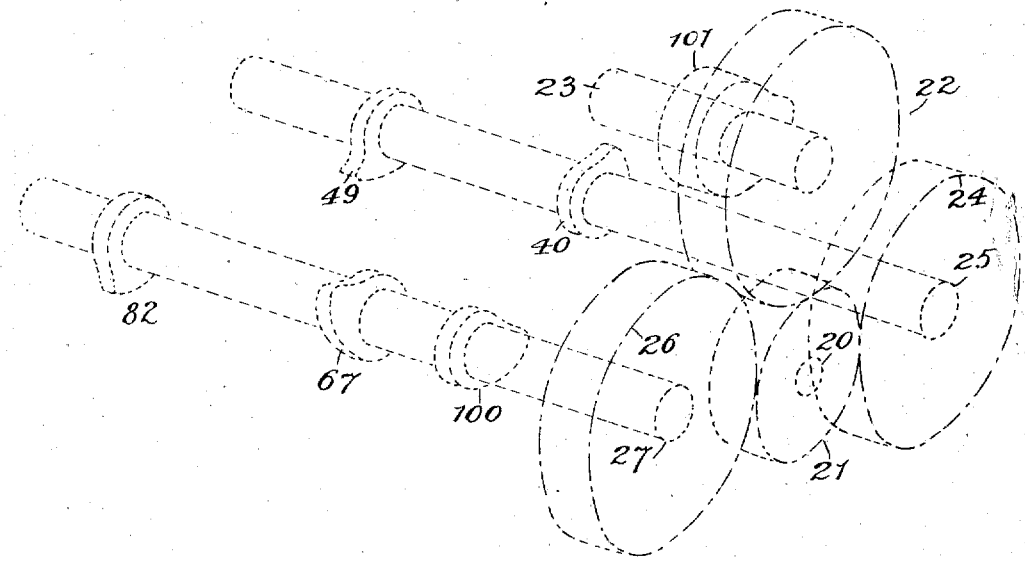
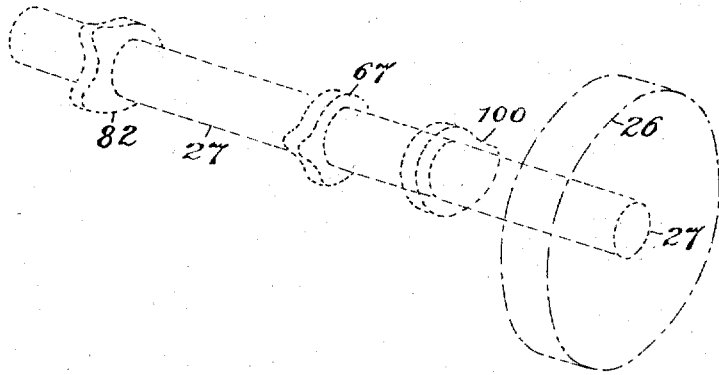

UNITED STATES PATENT OFFICE.

HUGO F. LIEDTKE, OF PHILADELPHIA, PENNSYLVANIA.

INTERNAL-COMBUSTION AND STEAM ENGINE.

1,217,788.  Specification of Letters Patent.  Patented Feb. 27, 1917.

Application filed November 18, 1912. Serial No. 732,006.

*To all whom it may concern:*

Be it known that I, HUGO F. LIEDTKE, a citizen of the United States, residing at Philadelphia, in the county of Philadelphia and State of Pennsylvania, have invented certain new and useful Improvements in Internal-Combustion and Steam Engines, of which the following is a specification, reference being had therein to the accompanying drawings.

This engine is designed to be actuated as a result of the alternate introduction into its cylinder of fluids, such as oil and air, that contribute to combustion therein, and of a fluid, such as steam, that is introduced under pressure and expanded therein.

The invention contemplates an engine capable of running in several cycles of operation, such as six and eight cycles, for example. In the six cycle, the strokes are as follows: 1, air intake; 2, air compression and fuel injection; 3, working stroke of burnt fluids; 4, exhaust of burnt fluids; 5, steam inlet and expansion; and, 6, steam exhaust. In the eight cycle, the strokes are as follows: 1, air intake; 2, air compression and fuel injection; 3, working stroke of burnt fluids; 4, exhaust of burnt fluids; 5, steam inlet and expansion; 6, steam exhaust; 7, steam inlet and expansion; and, 8, steam exhaust.

An object is to utilize some of the waste heat of combustion retained in the cylinder-walls, piston-head, and exhaust-passages and exhaust-conduit, and to avoid initial condensation and radiation of heat during expansion of steam in the cylinder, the arrangement being such that part of the heat of combustion is used to raise the temperature of the steam, or at least to prevent reduction of the temperature thereof below that at which it is delivered to the engine. A sufficient amount of heat is absorbed by the steam to make unnecessary the cooling-jacket with which internal-combustion engines usually are equipped. Further, the steam contributes to the cleansing of the cylinder of all burnt gases remaining after combustion in the cylinder.

In the six-cycle type, there is one steam admission for every fuel combustion. In some cases, however, after one steam admission, the cylinder-walls and piston-head may be too hot for wood working after fuel injection, when the eight-cycle type would be used, that is, there would be two steam admissions and exhausts after every fuel injection and combustion, so that the parts will be cooled sufficiently to avoid interference with the proper working of the incoming air.

There is provided also by the invention an auxiliary air-compressor and fuel-charging device so constructed that the employment of valves is unnecessary for its proper working.

Further, the invention contemplates a simple mechanism whereby the output of the fuel-pump is altered to meet the varying demands of the engine.

An effective mechanism for opening and quickly closing the steam-admission valve also is provided by the invention.

When read in connection with the description herein, the details of construction and arrangement of parts contemplated by the invention will be apparent from the accompanying drawings, forming part hereof, wherein preferable embodiments of the invention, as applied to six and eight cycle engines, are disclosed, for purposes of illustration.

While the disclosures herein now are considered to represent the best embodiments of the invention, it is to be understood that they merely are illustrative of the principles thereof, that the several instrumentalities employed in carrying out the invention can be organized variously within the limits prescribed by the claims hereinafter without departing from the nature and spirit of the invention, and that it is not the intention to be limited necessarily to the precise delineations herein in interpretation of the claims. It also is to be understood that the invention is susceptible of use with other fluids than those in connection with which it is described herein for purposes of explanation, and that the word "cylinder" is used as commonly employed in the art and it is not intended to limit the invention to parts of cylindrical shape.

Like reference-characters refer to corresponding parts in the several views of the drawings, of which—

Fig. 2 is a sectional view, looking from the front;

Fig. 3 is a side view, partly in section;

Fig. 4 is a sectional view of a form of steam-inlet-valve actuating mechanism;

Fig. 5 is an end view of the cam thereof;

Fig. 6 is a view in elevation of that cam;

Figure 1:
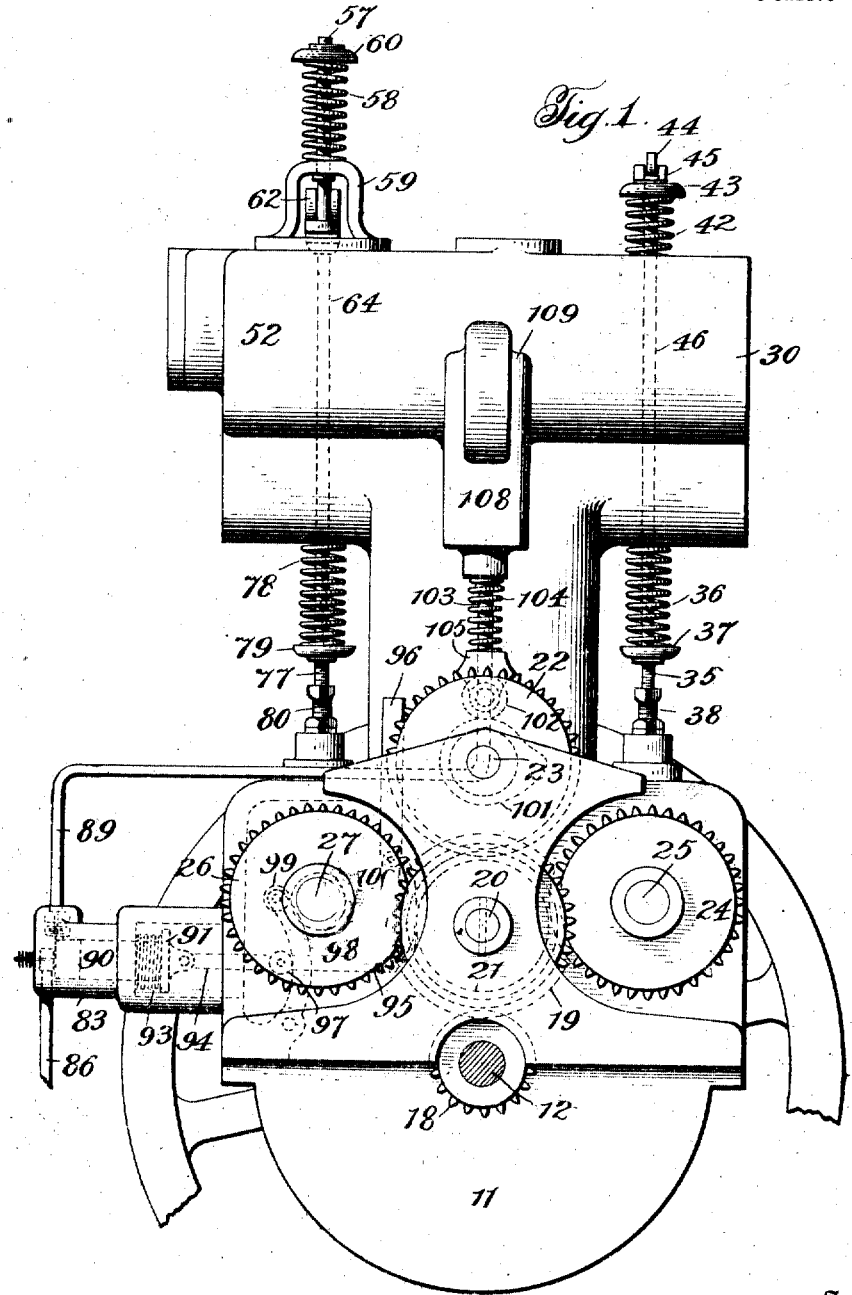
Figure 1 is a back view, in elevation.

Fig. 7 is a sectional view of an alternative form of air-pump;
Fig. 8 is a sectional view of the oil-pump;
Fig. 9 is a diagrammatic view of gears, shafts, and cams for six cycles; and
Fig. 10 is a diagrammatic view of a gear and a shaft and its cams for eight cycles.

Having more particular reference to the drawings, 11 designates the crank-case and base-frame, 12 the crank-shaft, 13 the pitman, 14 the piston having a head 15, 16 the cylinder, and 17 the cylinder-head of an engine.

For the purpose of actuating the valves and pumps of the engine, a mechanism is provided that includes the following: A gear 18 on the crank-shaft in mesh with a gear 19 rotatable on a centrally-positioned shaft 20 fixed in the case or frame of the engine, and attached to gear 19 a gear 21; in mesh with gear 21 a gear 22 rotatable on a centrally-positioned shaft 23 fixed in the case or frame of the engine; and to one side of gear 21, and in mesh therewith, a gear 24 on a cam-shaft 25, and to the other side a gear 26 on a cam-shaft 27, both of these shafts being journaled in the case or frame of the engine.

At or near the head 17 of the cylinder is a port 28 in communication with a valve-chamber 29 in an extension 30 of the cylinder structure. An air-supply conduit 31 communicates with this chamber and has admission of air to the chamber controlled by a valve 32 movable inwardly with respect to the chamber. A conduit 33 for exhaust of burnt gases also communicates with the chamber, there being an inwardly-movable valve 34 for controlling exhaust of said gases.

The valve 32 has thereon a valve-stem 35, with which is associated a spring 36 operating to keep the valve normally on its seat and closed, this spring being interposed between the extension of the cylinder structure and an adjustable abutment 37 on the valve-stem, which abutment permits adjustment of the tension of the spring. The outer or free end of the valve-stem is connected or contacts with an end of a push-pin 38, which has an anti-friction roller 39 on its other end held by the spring 36 in contact with a cam 40 on cam-shaft 25, the arrangement being such that as the cam rotates the valve 32 will be moved from its seat and opened periodically.

The valve 34 has thereon a valve-stem 41, with which is associated a spring 42 operating to keep the valve normally on its seat and closed, this spring being interposed between the extension of the cylinder structure and an adjustable abutment 43 on the valve-stem, which abutment permits adjustment of the tension of the spring. The outer or free end of the valve-stem is connected or contacts with an end of a link 44 pivotally mounted intermediate its ends on a standard 45 and having its other end connected with a rod 46 connected with one end of a push-pin 47, which has an anti-friction roller 48 on its other end in contact with a cam 49 on cam-shaft 25, the arrangement being such that as the cam rotates the valve 34 will be moved from its seat and opened periodically.

A port 50 is located at or near the head of the cylinder and diametrically disposed with respect to port 28. Port 50 communicates with a valve-chamber 51 in an extension 52 of the cylinder structure. A steam-supply conduit 53 communicates with this chamber, and a valve 54 movable inwardly with respect to the chamber controls admission of steam thereto from the conduit. A steam-exhaust conduit 55 also communicates with this chamber, and exhaust of steam is controlled by a valve 56 inwardly movable with respect to the chamber.

The valve 54 has thereon a valve-stem 57, with which is associated a spring 58 operating to keep the valve normally on its seat and closed, this spring being interposed between a yoke 59 on the extension of the cylinder structure and an adjustable abutment 60 on the valve-stem, which abutment permits adjustment of the tension of the spring. The valve-stem 57 also has thereon an abutment 61 in contact with a bifurcated end of a link 62 pivotally mounted intermediate its ends on a standard 63 and having its other end connected with a rod 64 connected with one end of a push-pin 65, which has an anti-friction roller 66 on its other end in contact with a cam 67 on cam-shaft 27, the arrangement being such that as the cam rotates the valve 54 will be moved from its seat and opened periodically.

In order to impart quicker opening and closing movements to the push-pin 65 and thereby to the steam-inlet valve than is caused by the form of cam 67 shown, there may be employed in place of that cam a mechanism of the form shown by Figs. 4, 5, and 6. This mechanism incl'··; an abutment 68 on the cam-shaft 27 and an arm or extension 69 on the crank-case ending in proximity to the shaft, and between this extension and abutment there are a spring 70 and a cam 71 loose on the shaft, the spring having a tendency to force the cam axially against the extension, and the cam being prevented from rotative movement with respect to the shaft by a key 72. The face 73 of the cam, which contacts with the extension 69, is beveled or oblique with respect to the axial line of the shaft, so that as the cam rotates it will have axial reciprocatory movement under influence of the spring and contact with the extension. The cam is formed with a projection 74 arranged to be brought into contact with th roller 66 of the push-pin 65 to periodically reciprocate the latter. This projection has a gradual outward slope from the spring-contacted side of the cam, as indicated by 74ª, and a sudden drop on its opposite side, as indicated by 74ᵇ, and the relative positions of the projection and beveled face 73 are such that, as the projection turns into contact with the push-pin roller, by axial movement the greatest point of eccentricity is brought into contact with the roller and the steam-inlet valve opened and then on continuance of axial movement the cam passes beyond the roller and the push-pin suddenly drops and the valve is suddenly closed.

In order to balance valve 54, and to prevent its being opened by steam pressure from conduit 53 overcoming the tendency of spring 58, a piston 75 of the same steam-exposed area as that of the valve is positioned on the valve-stem and in a cylinder 76, the cylinder having an open end in position to receive steam against the piston in a direction opposite to the steam pressure against the valve, whereby the force exerted on the valve-stem by steam is the same in both directions.

Valve 56 has thereon a valve-stem 77, with which is associated a spring 78 operating to keep the valve normally on its seat and closed, this spring being interposed between the extension of the cylinder structure and an adjustable abutment 79 on the valve-stem, which abutment permits adjustment of the tension of the spring. The outer or free end of the valve-stem is connected or contacts with an end of a push-pin 80, which has an anti-friction roller 81 on its other end in contact with a cam 82 on cam-shaft 27, the arrangement being such that as the cam rotates the valve will be moved from its seat and opened periodically.

The burnt-gas-exhaust conduit 33 includes a jacket that surrounds the steam-supply conduit 53 and the steam-inlet-valve structure, as shown by 33ª between the cylinder-head 17 and the conduit 53, at 33ᵇ, and at 33ᶜ, whereby some of the heat of the burnt gases is communicated to parts with which the incoming steam comes into contact and heat is absorbed by the steam, with the result that the temperature of the steam is raised or at least prevented from falling. The exhaust gases are delivered at 33ᵈ to the atmosphere or to any suitable conduit leading to a desired place of delivery.

In order to deliver fluid fuel, such as oil, periodically to a charging device, hereinafter described, in the quantity required to meet the demands on the engine, there is provided a pump that includes a cylinder 83, into which in or near its head leads an admission-port 84, having therein an inwardly-opening spring-controlled valve 85, and with which port communicates an oil-supply conduit 86, and from which cylinder leads an exit-port 87, having therein an outwardly-opening spring-controlled valve 88, and with which port communicates a conduit 89 leading to the charging device. Projecting into the cylinder is a piston 90, having exterior of the cylinder an abutment 91, between which and a shoulder 92 at the end of the cylinder is interposed a spring 93 having a tendency to move the piston outwardly of the cylinder. A pitman 94 at one end is pivotally connected with the piston and at the other end with a link 95 with which is connected a longitudinally-movable rod 96. The pitman has thereon intermediate its ends an anti-friction roller or abutment 97 kept by spring 93 in contact with an arm or lever 98 pivoted at one end on any suitable fixed part and having at its other end an anti-friction roller 99 in contact with a cam 100 on the cam-shaft 27, the cam operating to vibrate the lever. The arrangement is such that as the cam rotates the piston is reciprocated in the cylinder, through the instrumentality of the cam, lever, and pitman being given compression strokes inwardly, and by the spring action suction strokes outwardly. On a suction stroke, the suction will open valve 85 and oil will be drawn in from supply-conduit 86, the valve 88 then remaining closed and preventing backward movement of oil from the conduit 89. On a compression stroke, valve 85 will remain closed, valve 88 will be open, and oil will be forced into conduit 89. By swinging the pitman so that its anti-friction roller or abutment may contact with the lever a greater or less distance from its pivotal point, the scope of movement of the piston may be increased or decreased and the amount of oil ejected thereby correspondingly altered. This alterative movement of the pitman is effected by movement of rod 96, which rod may be connected with a speed-governor or may be provided with means by which it may be set manually.

The means by which charges of fuel are injected successively into the engine-cylinder includes a cam 101 connected with and rotated by gear 21, with which cam an anti-friction roller 102 on the end of a piston-rod 103 is held in contact by a spring 104 interposed between an abutment 105 on the piston-rod and a fixed abutment 106, and on the other end of which piston-rod is an elongated pump-piston 107 reciprocable in a pump-cylinder 108 constituting a part of an extension 109 of the engine-cylinder structure. The cam operates to give compression strokes and the spring return or recessive strokes of the piston. From the head of the cylinder toward which the piston has compression strokes leads a passage 110, which again opens into the side of the cylinder at a port 111 just beyond the head of the piston when in its withdrawn or recessive position. A passage 112 in communication with the engine-cylinder opens to the charging or injecting cylinder 108 at a point diametrically opposite to the port 111. A passage 113 extends from side to side of piston 107 in such position that it will register with and afford communication between port 111 and passage 112 when the piston is at or about at the limit of its compression stroke, and be out of registry therewith at other times.

Instead of the charging cylinder and piston being of the form just described, it also may be of the form shown by Fig. 7, in which it is unnecessary to employ the lateral passage 110. In Fig. 7, 114 designates the cylinder and 115 the piston, and in the piston is a passage 116 extending longitudinally from its head and then laterally, ending in the side of the piston at a point when it will come into registry with the passage 112 in the same manner as described for passage 113 of the other form. Also in this form there is a vent 117 in the wall of the cylinder, which opens to the atmosphere, and so positioned that the lateral end of the passage 116 will come into registry with it when the piston has reached the limit of its recessive movement.

The conduit 89 from the fuel-pump leads to a port 118 opening into the passage 112 at a point between the charging-cylinder and the engine-cylinder, and this port has therein a spring-controlled valve 119 arranged to permit admission of fuel to the passage and to prevent back flow of fuel into the port and conduit.

Assuming that the parts are in the positions shown, and that the air-admission valve 32 just has closed after the engine-piston by a stroke from the cylinder-head has drawn in a charge of air, the charging-piston 107 being at the limit of its recessive movement, and the oil-pump piston 90 also being at the limit of its outward movement, the six-cycle operation of the parts, starting from these assumed positions, now will be described.

For six cycles the gears for actuating the valves and pumps are so proportioned that three rotations of gear 18 on the crank-shaft will give one rotation to gears 24 and 26 and cam-shafts 25 and 27 and to gear 22 and the cam 101 connected thereto.

The cams are so formed and set that they will operate the valves and pumps as and at the times described.

The crank-shaft continuing to rotate, the engine-piston moves toward the cylinder-head in a compression stroke. At about the time this piston has performed about one-fourth of its compression movement, the oil-pump piston 90 will be given a compression stroke and oil will be sprayed into the passage 112. At the same time, a continuous compression stroke of the charging-piston 107 is commenced and that piston immediately covers and closes the end of passage 112, whereby the introduction of oil into the charging-cylinder is prevented. During the part of the compression stroke of the engine-piston that is made before closing of passage 112, not only air in the engine-cylinder is compressed, but also to the same degree the air in the charging-cylinder between its head and the piston 107 through the passage 112. The engine-piston continues its compression movement and thereby further increases the pressure and raises the temperature of the air in the engine-cylinder and in the passage 112, whereby the temperature of the oil in the passage is raised and the oil made susceptible of complete vaporization and burning when it is blown into the engine-cylinder. During the compression stroke of the charging-piston, the air in the charging-cylinder is compressed to a still greater density and thereby its temperature raised to a degree above the ignition point of the fuel used. At or about at the end of the compression stroke of the charging-piston, the passage 113 comes into registry with port 111 and the end of passage 112, or in the case of the Fig. 7 form the lateral end of passage 116 comes into registry with the end of passage 112. When the charging-piston reaches that position, the highly-compressed air passes from the charging-cylinder around through passages 110, 113, and 112, or through passages 116 and 112 in the case of the Fig. 7 form, into the engine-cylinder. Then the oil in passage 112 is picked up and becomes commingled with the air and is blown into the engine-cylinder and ignited by the heat of the air. Gas thus is produced that acts in the engine-cylinder against the piston therein and imparts to the piston a working stroke, the amount of air confined being sufficient for combustion of all oil. The amount of oil delivered to passage 112 is so regulated that it will be sufficient as it is burned to furnish gas in the quantity necessary to maintain a constant pressure during the fuel-injection period, which is about one-eighth of the total working stroke of the engine piston. The compression movement of the charging-piston is such that the piston-passage 113 (or 116) gradually comes into registry with the end of passage 112, so that at first the amount of air passing into the passage is comparatively small and then gradually increases as the piston-passage and the engine-passage come into complete registry. Thus, while the velocity of flow of air at all times during this period is very high, the quantity of air gradually increases and the amount of oil taken up and blown into the engine-cylinder correspondingly increases to provide the increasing amount of gas required for the increasing cylinder volume as the engine-piston moves in its working stroke.

After commencement of the working stroke of the engine-piston, the charging-piston commences its withdrawal or recessive stroke, which is intermittent or has a pause therein, that is, the cam 101 will be moved so that it will permit spring 104 to partly withdraw the charging-piston to such position that its passage 113 (or 116) will be out of registry with the end of passage 112 and that passage closed by the side of the piston, whereby the blowing of burnt gases thereafter into the charging-cylinder is prevented. The arrangement also is such that this position of the charging-piston is maintained during the gas-exhaust stroke and until the steam-exhaust stroke of the engine-piston, as will be described.

At the end of the working stroke of the engine-piston, the burnt-gas-exhaust valve 34 will be opened and held open during the exhaust stroke of the engine-piston that now is made. The hot burnt gases on exhausting travel through conduit 33 around the steam-supply conduit 53 and the steam-inlet-valve structure and heat those parts and the steam, as described. The valve 34 will close just before the engine-piston reaches the end of its exhaust stroke. When the piston finishes this stroke, the burnt gases remaining in the engine-cylinder will be slightly compressed.

The steam-inlet valve 54 then will be opened and steam under pressure admitted to the engine-cylinder and the valve then closed, and the steam on expanding gives a working stroke to the engine-piston. At the end of this stroke, the steam-exhaust valve 56 will be opened and the expanded steam permitted to exhaust. When the steam-exhaust valve is opened, the charging-piston will be permitted to resume its recessive movement under the action of the spring 104 to such position that port 111 and the end of passage 112 will be open, whereupon the gases remaining in the charging-cylinder after the passage 112 was closed, as hereinbefore described, will be permitted to pass into the engine-cylinder through that passage and to be exhausted with the steam during the exhaust stroke of the engine-piston that now is made.

In the Fig. 7 form of charging device the cam 101 is so formed that, immediately after the charging-piston has reached the limit of its recessive movement and the lateral end of passage 116 has come into registry with vent 117, the piston is given sufficient movement in the compression direction to discontinue this registry and close the vent, this movement stopping at this time short of the end of passage 112, as indicated by the dotted line, Fig. 7. This short period of registry of the passage 116 and the vent 117 takes place during the last part of the steam-exhaust stroke of the engine-piston, and the first part of the air-intake stroke of that piston, so that steam is blown through the charging-cylinder, passage 116, and vent 117 and all remaining exhaust gases thereby expelled and so that air then is drawn through by suction of the engine-cylinder in its air-intake stroke to expel all steam.

At the end of the steam-exhaust stroke, the steam-exhaust valve will close, and the air-inlet valve will open, and on the next outward stroke of the engine-piston air will be drawn into the cylinder. At the end of this stroke, the parts will be in the positions described at the beginning of this explanation of operation.

For eight cycles the gears for actuating the valves and pumps are so proportioned that four rotations of the gear 18 on the crank-shaft will give one rotation to gears 24 and 26 and cam-shafts 25 and 27 and to gear 22 and cam 101 connected thereto. The cams 40 and 49, which respectively operate the air-inlet valve 32 and burnt-gas-exhaust valve 34, the cam 100, which operates the oil-pump, and the cam 101, which operates the charging device, will each have one projection, as in the case of six cycles, while the cams 67 and 75, which respectively operate the steam-inlet valve 54 and the steam-exhaust valve 56, will each have two closely-successive projections, so that there shall be two successive admissions and exhausts of steam after every oil admission, combustion, and exhaust.

It will be understood, of course, that by rearranging the gears and cams the engine may be set for other cycles of operation than those described, and that the relative numbers of operations by steam and internal combustion may be changed at will.

Having thus described my invention, what I claim as new, and desire to secure by Letters Patent, is—

1. An engine comprising a cylinder, a piston reciprocable therein, a valve arranged to admit air to the cylinder during an outward stroke of the engine-piston, the arrangement being such that air in the cylinder is compressed during the next compression stroke of the engine-piston, a charging device comprising a piston and a cylinder within which said charging-piston reciprocates, there being a passage affording communication between said engine and charging cylinders whereby when air in the engine-cylinder is compressed by the engine-piston it also is compressed in the charging-cylinder, an actuating device arranged to move said charging-piston after initial compression and to a greater degree compress the air in said charging-cylinder, means whereby said passage is closed during compression movement of said charging-piston and opened at the end of such movement, means whereby combustible material is injected into said passage and the engine-piston given a working stroke, a valve opening on the next inward stroke of the engine-piston and permitting the resultant of combustion to exhaust, a valve arranged thereupon to admit steam to said engine-cylinder whereby said engine-piston is given a working stroke, and a steam-exhaust valve opening on the next inward stroke of said engine-piston.

2. An engine comprising a casing, a movable element in the casing arranged to have working forces act thereon to produce motion, a conduit arranged to supply fluid under pressure, a fluid-pressure-admission device, a fluid-pressure-exhaust device, means whereby combustible material is ignited and caused to act in said casing against said element, an exhaust device for the resultant of combustion, and an exhaust conduit for said resultant surrounding said fluid-supply conduit.

3. The combination of an engine comprising a cylinder, a piston reciprocable therein, opening and closing air-admission means so arranged that periodically on one stroke of said piston air will be drawn into said cylinder and on the next stroke compressed therein, there being a charging-passage opening into the compression area of said cylinder, an air-pump comprising a cylinder, a piston reciprocable therein, said charging-passage opening into said pump-cylinder at a point beyond the normal position of the piston therein whereby air compressed in said engine-cylinder is forced into said pump-cylinder, and means whereby said pump-piston is moved to overrun the end of said charging-passage and the charge of air in said pump cylinder further compressed, there being in said pump-piston a passage arranged to receive at one end air compressed in said pump-cylinder and having its other end in position to register with the end of said charging-passage after compression movement of said pump piston.

In testimony whereof I affix my signature in presence of two witnesses.

HUGO F. LIEDTKE.

Witnesses:
HANS WENIGER,
W. F. OPINGER.